Nov. 16, 1965     M. B. MANDZIAK     3,218,435
ELECTRIC KETTLES
Filed Sept. 26, 1963     4 Sheets-Sheet 1
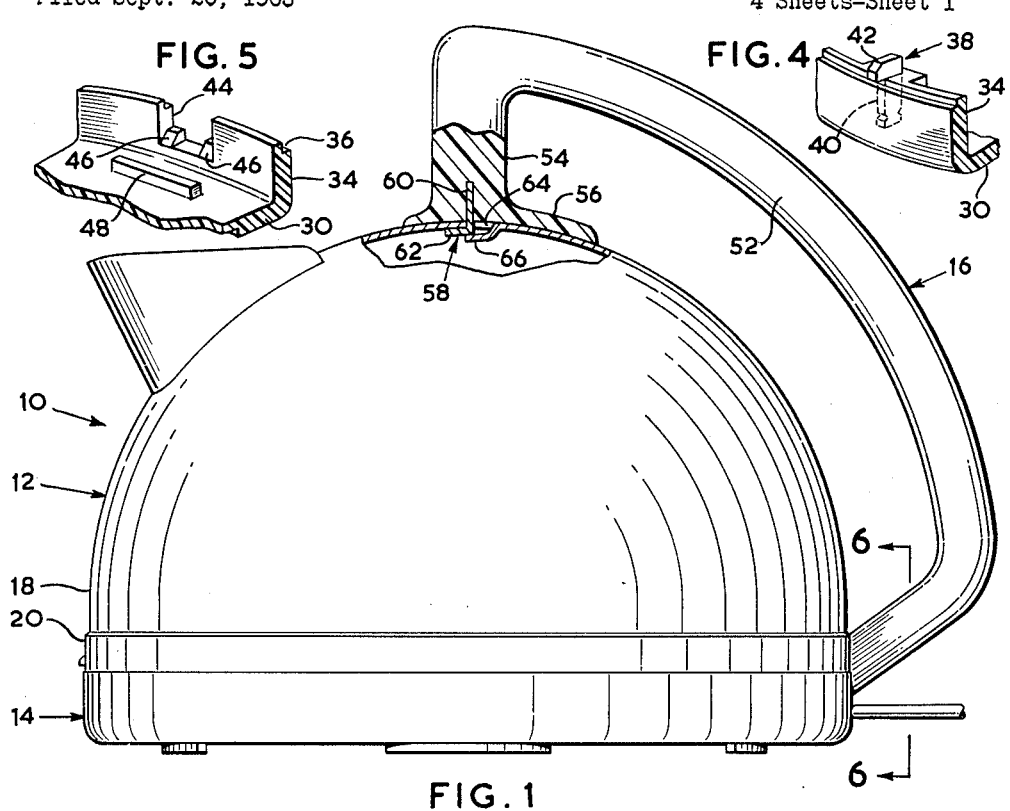
FIG. 5     FIG. 4
FIG. 1
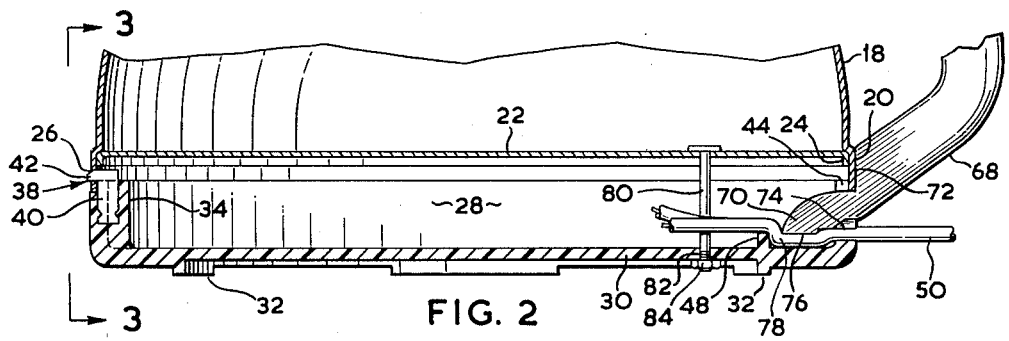
FIG. 2
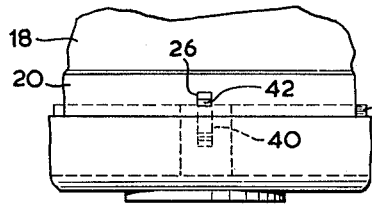
FIG. 3
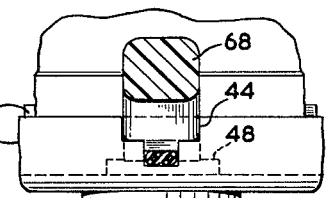
FIG. 6
INVENTOR
MYRON B. MANDZIAK
BY *Frederick C. Bromley*
ATTORNEY Nov. 16, 1965  M. B. MANDZIAK  3,218,435
ELECTRIC KETTLES
Filed Sept. 26, 1963  4 Sheets-Sheet 2
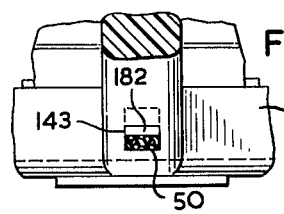
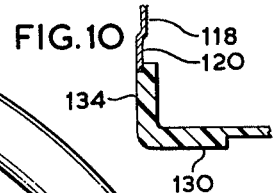
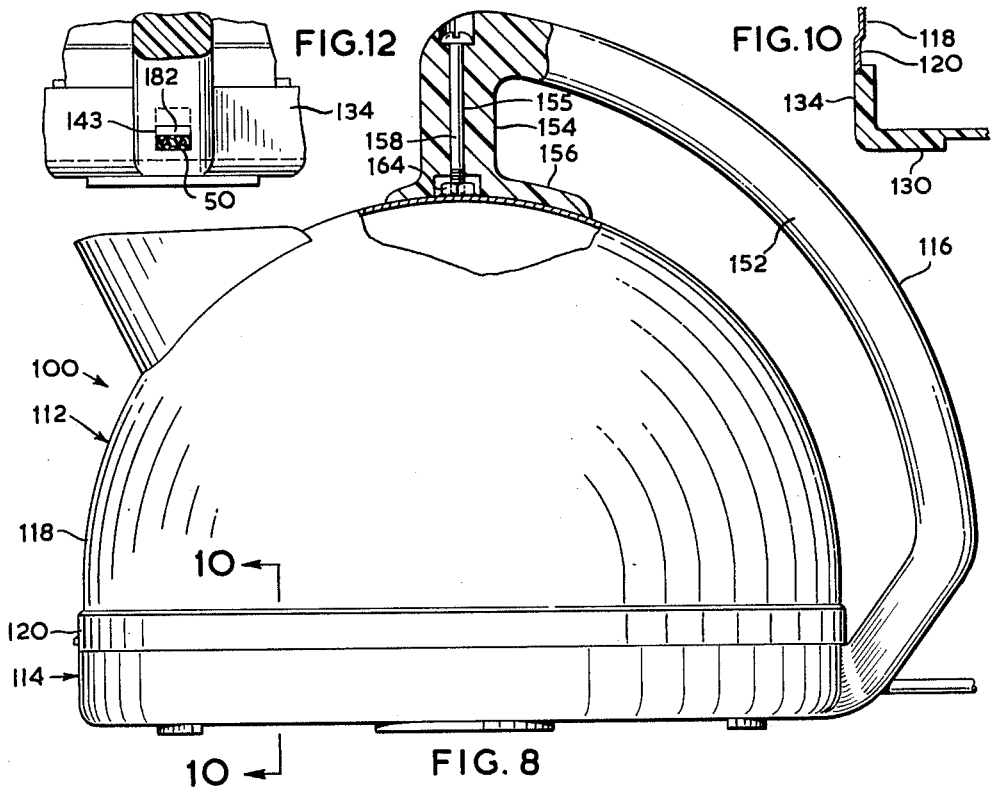
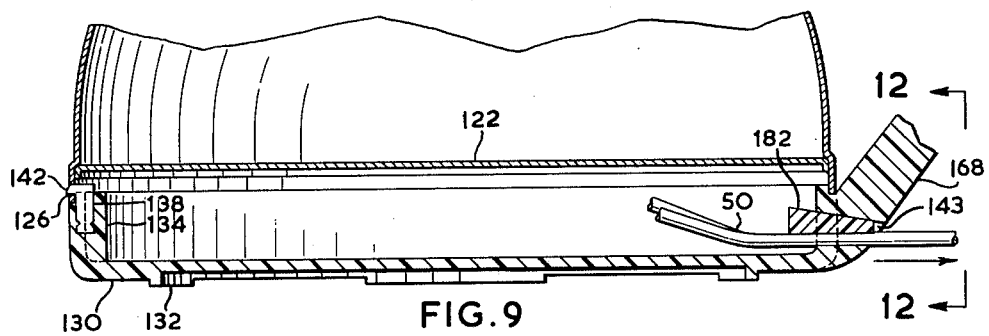
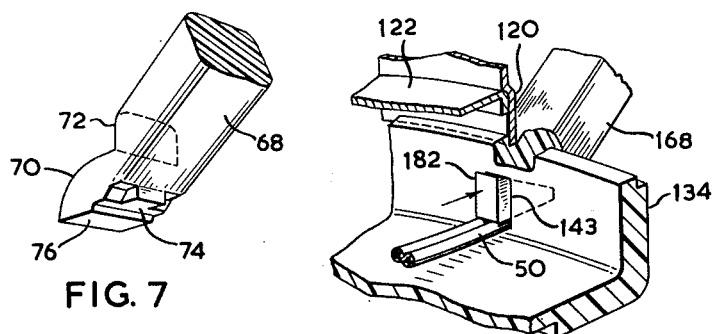
INVENTOR
MYRON B. MANDZIAK
BY Frederick E. Bromley
ATTORNEY

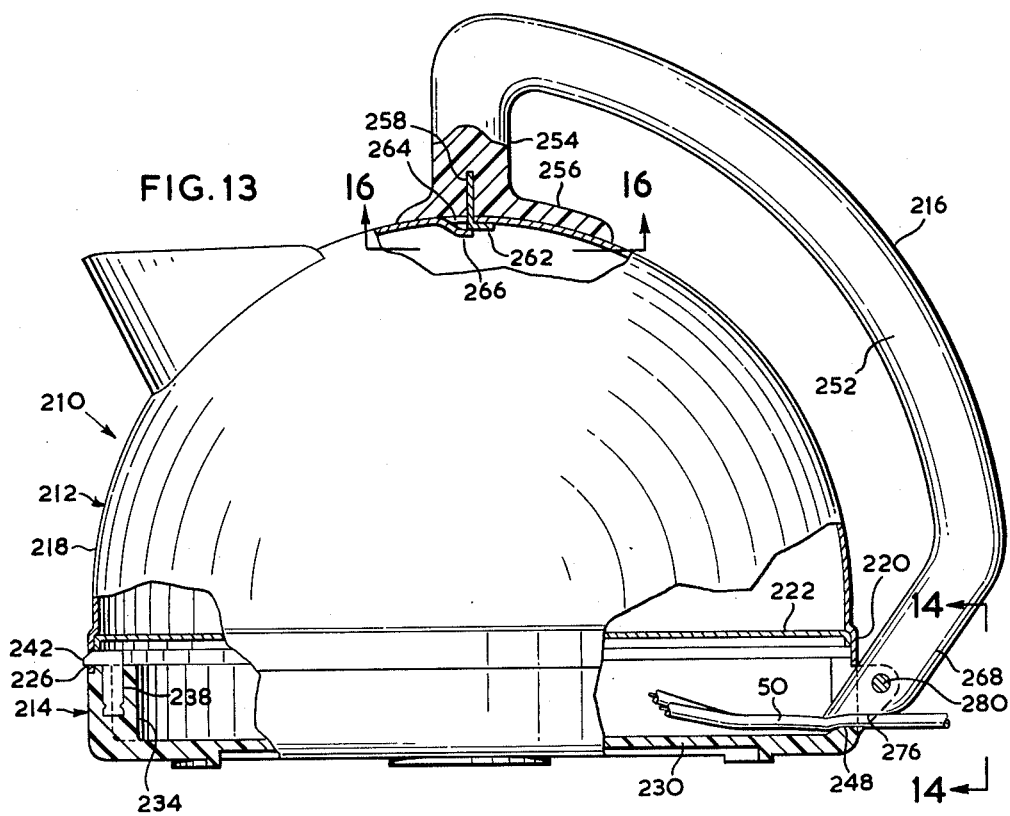
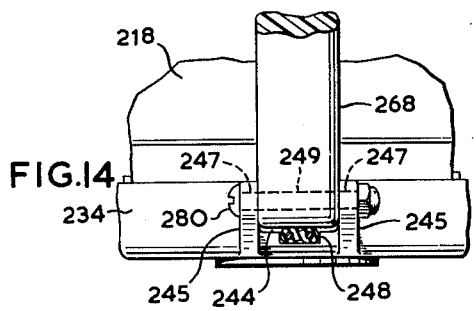
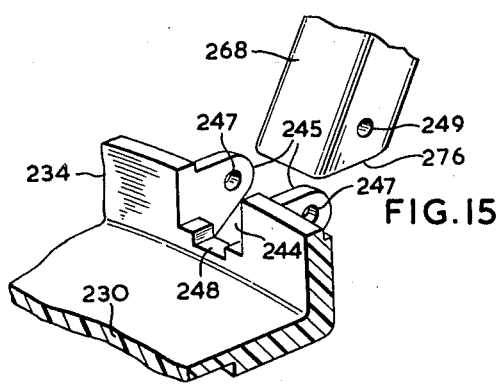
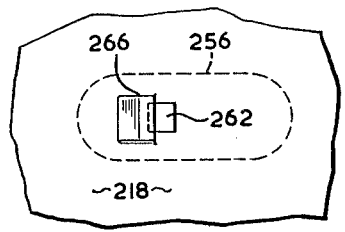

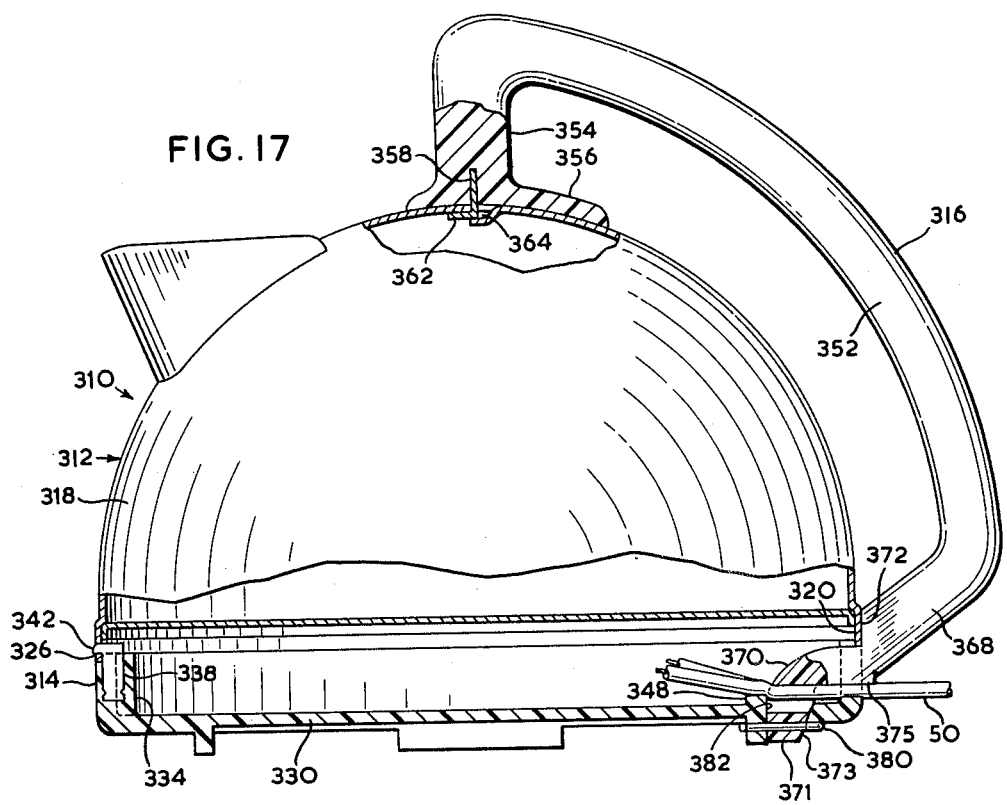
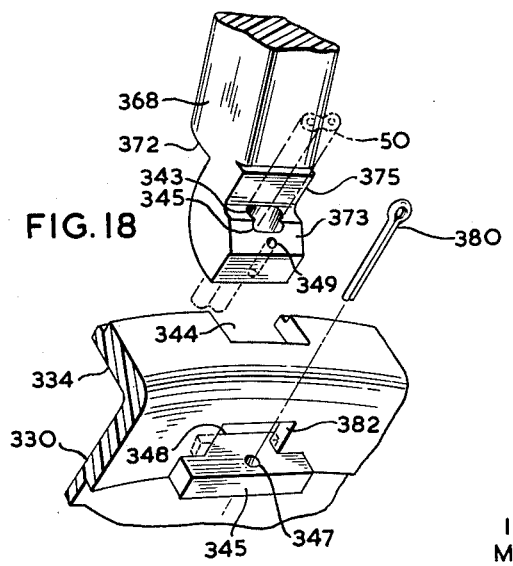

United States Patent Office 3,218,435
Patented Nov. 16, 1965

3,218,435
ELECTRIC KETTLES
Myron B. Mandziak, 50 Harold St., Toronto, Ontario, Canada
Filed Sept. 26, 1963, Ser. No. 311,707
17 Claims. (Cl. 219—437)

This invention relates generally to kettles which include a self-contained electrical heating unit, and is particularly concerned with improvements in the manner of assembling the handle and a false bottom on a fluid container or shell.

The present invention will be described in detail with respect to a hot water kettle; however, the present invention is adapted for use on electric coffee pots and the like.

In addition to affording a suitable container to heat fluids, electric kettles or the like should be insulated from a surface upon which they rest to prevent damage to the finish thereof; should include a handle which permits ready handling of the kettle without injury to the user; the handle should be of a character to afford the proper balance and strength; the parts should be readily assembled and disassembled; and the kettle should include electrical connections of a substantially permanent character with a minimum amount of wear to electrical cord and the like.

A primary object of the present invention is to provide improvements in electric kettles to afford all of the requisite qualities mentioned above.

A further object of the present invention is to provide an improved electric kettle with novel means for assembling a false bottom and handle thereon.

Another object of the present invention is to provide an improved handle construction which is integrated with a false bottom and affords strain relief means for the electrical cord thereof.

A still further object of the present invention is to provide a novel handle assembly on an electric kettle in which optimum balance is attained together with strain relief means for the electric cord connection thereof.

These together with other and more specific objects and advantages of the present invention will become apparent to those skilled in the art from a consideration of the following specification when taken in conjunction with the drawings forming a part thereof, in which like reference numerals identify similar parts, wherein:

In the drawings:

FIGURE 1 is a side elevation of a kettle incorporating the features of the invention, an upper portion of the handle being broken away to show construction details;

FIGURE 2 is a fragmentary sectional view of the lower portion of the kettle of FIGURE 1, taken medially of the kettle, particularly showing details of the construction of the kettle base and handle mounting;

FIGURE 3 is a fragmentary front elevation taken substantially on the plane of line 3—3 of FIGURE 2;

FIGURE 4 is a fragmentary perspective view of the kettle base showing in detail the keeper element thereof;

FIGURE 5 is a fragmentary perspective view of the inner, rear portion of the kettle base showing the portion in which the lower portion of the handle is mounted;

FIGURE 6 is a sectional view taken substantially on the plane of line 6—6 of FIGURE 1, showing the lower end of the kettle handle;

FIGURE 7 is a fragmentary perspective view of the lower end of the handle;

FIGURE 8 is an elevational view similar to FIGURE 1 and showing another embodiment of the invention, portions at the upper end of the handle being broken away;

FIGURE 9 is a view similar to FIGURE 2 showing details of the kettle base of the embodiment of FIGURE 8;

FIGURE 10 is a vertical section taken substantially on the plane of line 10—10 of FIGURE 8, showing details of the kettle base edge;

FIGURE 11 is a fragmentary perspective view looking from the inside of the kettle base at the lower end of the kettle handle;

FIGURE 12 is a vertical section taken substantially on the plane of line 12—12 of FIGURE 9, looking at the lower end of the handle of the embodiment of FIGURE 8;

FIGURE 13 is an elevational view similar to FIGURES 1 and 8 and showing a further embodiment of the invention with portions broken away to show structural details;

FIGURE 14 is a vertical section taken substantially on the plane of line 14—14 of FIGURE 13 looking at the lower end of the handle;

FIGURE 15 is a fragmentary perspective view looking from the inside of the kettle base of FIGURE 13, and showing the lower end of the handle removed therefrom;

FIGURE 16 is a bottom plan view of the upper end of the handle looking from the inside of the kettle substantially from the plane of line 16—16 of FIGURE 13;

FIGURE 17 is an elevational view similar to FIGURES 1, 8 and 13, portions being broken away to show structural details; and FIGURE 18 is a perspective view of the rear lower portion of the handle of FIGURE 17, showing the electrical cord by phantom lines, the lower end of the handle and retaining pin being separated from the kettle base.

Referring to the drawings in detail, and first considering FIGURES 1-7, an electrically heated hot water kettle is indicated generally at 10 and comprises a shell indicated generally at 12, a base indicated generally at 14, and a handle indicated generally at 16.

The shell 12 includes, preferably but not necessarily, a metal dome 18 terminating in a lower, slightly outwardly extending peripheral flange 20. Extending transversely of the flange 18 is a metal bottom 22 which includes a peripheral flange 24 sealingly secured to the flange 20 by means of brazing or the like. The flange 20 includes transversely of the forward edge thereof an aperture 26; see FIGURE 3, for receiving a lip portion of a keeper element therethrough, as will subsequently be described in detail.

The base 14 will be produced from any suitable material, plastic such as Bakelite, metal, etc., and will provide with the bottom 22 a space 28 which will contain a conventional heating element, such as Calrod or the like (not shown).

The base 14 includes a lower base wall 30 including a plurality of depending feet 32 to provide an air space therebeneath and prevent contact and heat damage to a support surface. The base wall 30 is molded integrally with a peripheral, upwardly extending flange 34 which is peripherally stepped at 36 to be telescopically received or mated with the lower edge of the flange 20.

Embedded in the front edge of the flange 34 is a vertically extending, preferably metal keeper element indicated generally at 38 and comprising a shank portion 40 having a lower irregular portion about which the base material will form to firmly retain the keeper element in the flange 34. The shank 40 terminates in a forwardly extending lip portion 42 which will be in alignment with and be received in the aperture 26 when the base 14 is mounted on the shell 12.

The base 14 includes in substantially diametrically disposed relation (on circular kettles) to the keeper element 38 and formed in the flange 34 an upwardly opening notch portion 44 which will receive the lower end of the handle 16 therein; see FIGURES 2, 5 and 6. The notch portion 44 terminates above the base wall 30 and includes at opposite side edges thereof vertically extending, polygonal block portions 46. Formed integrally with the upper surface of the base wall 30 and spaced inwardly of the notch portion 44 is a vertically extending ridge plate or rib element 48 which will provide strain-relief means in cooperation with portions of the handle 16 for the electrical cord 50 which will be connected to suitable terminals of the heating element (not shown).

The handle 16 will be produced from a suitable plastic or the like, extends from the upper end of the shell 12 or down to the rear end of the base 14. The handle 16 includes an intermediate hand-grip portion 52 extending substantially along the full length of one side of the body portion 18 to provide optimum control and balance for a user of the kettle. The upper end of the handle-grip portion 52 continues in an angular depending portion 54 which terminates in foot plate 56 conforming to the outer surface of the body portion 18 and distributing stresses on this end of the handle when the kettle is lifted from a support surface. The portion 54 has embedded therein mounting means comprising a substantially L-shaped keeper element indicated generally at 58 and including one leg 60 fixedly secured in the handle portion 54 and a lateral leg 62 which will extend below the inner surface of the body portion 18. The body portion 18 has formed therein a slot 64 receiving the leg 62 therein, the slot 64 being formed by a louvre-like construction formed by upsetting the portion 66 at the upper end of the body portion 18 of the shell 12.

The hand-grip portion 52 includes a lower angular extension 68 terminating in a heel portion 70; see FIGURES 2 and 7. The heel portion 70 forms a shoulder 72 which will engage the outer surface of the flange 20; see FIGURE 2. The heel portion 70 is substantially the same width as the notch 44 and includes a lower surface 74 complementary to the lower edge of the notch and block portions 46. The heel portion 70 terminates in a lower foot portion 76 which will project slightly below the upper edge of the rib element 48; see FIGURE 2, to engage the cord 50 and depress it at 78 to prevent excessive tension from being imposed on the terminal connection of the cord with the heating element (not shown).

The bottom wall 22 has sealingly secured thereto a depending stud 80 which extends through an aligned aperture 82 formed in the base wall 30; see FIGURE 2, and a retaining nut 84 engages the lower threaded end of the stud 80.

Assembly and disassembly of the various component parts of the kettle is relatively simple. Removal of the nut 84 will permit the base 14 to be pivoted downwardly at the lip portion 42 and access may be had to the compartment 28 and the heating element which will be contained therein. The handle 16 can be readily removed after the nut 84 is removed by pivoting it about the leg 62 and removing the leg 62 from the slot 64.

Reassembly comprises insertion of the leg 62 in slot 64, insertion of the lip 42 in slot 26 and pivoting the base 14 onto the lower flange of the shell, the heating cord 50 having previously been positioned in the notch portion 44. The nut 84 is then threaded onto the lower end of the stud 80.

Referring to FIGURES 8–12, another embodiment of the novel kettle is indicated generally at 100 and comprises a shell portion 112 substantially of the same character as that shown in FIGURES 1–7. The shell 112 has removably mounted on the lower edge thereof a base 114 which in this embodiment is integrally molded with a handle 116.

The shell 112 includes a body portion 118 having a suitably secured bottom wall 122 and peripheral flange 120. The flange 120 includes a forward aperture 126 cooperating with the lip of a keeper element to be described.

The base 114 includes a base wall 130 including depending feet 132 and has embedded in the upwardly extending flange 134 thereof a keeper element 138. The keeper element 138 includes a forwardly projecting lip portion 142 received in the aperture 126 of flange 120 of the shell. The flange 134 includes in diametrically opposed relation to the keeper element 138; see FIGURES 9 and 11, a tapered, transverse aperture 143 which will receive an intermediate portion of the cord 50. The flange 134 is molded at the aperture 143 integrally with the lower handle portion 168 of a hand-grip portion 152 similar to that previously described. The lower end of portion 168 has the tapered aperture 143 opening therethrough so that the cord 50 can be threaded therethrough. Received within the tapered aperture 143 in engagement with the upper surface of the cord 50 is a wedge element 182 comprising the strain-relief means for the cord 50.

If excessive tension is applied to the cord 50 as indicated by the direction arrow of FIGURE 9, the wedge block 182 will tend to be drawn through the aperture 143, as indicated by the direction arrow in FIGURE 11 to prevent excessive tension on the heater element terminals (not shown).

The body portion 118 of the shell includes at the upper end a fixedly secured boss comprising a nut element 164 or the like which comprises the means for disassembling the kettle. The handle-grip portion 152 includes an upper depending portion 154 terminating in a foot portion 156 conforming to the upper surface of the body portion surrounding the nut element 164. The handle portion 154 has extending therethrough a bore portion 155 in which is received an elongated retaining screw 158 threadedly engaging the nut element; the foot portion 156 including a suitable recess to accommodate the nut element 164.

In order to disassemble the handle and base, the screw 158 is removed, and the base and handle can be pivoted at lip portion 142 out of the aperture 126 in the shell flange 120. Assembly is merely the reversal of the just-described procedure.

The embodiment of FIGURES 8–12, just as that previously described, includes a single fastener permitting ready assembly and disassembly of the component parts as well as strain relief means for the heating element cord.

Referring to FIGURES 13–16, another embodiment, similar to that of FIGURES 1–7, comprises a kettle indicated generally at 210 and includes a shell 212, a base 214 and a handle 216.

The shell 212 includes a body portion 218 having a transverse bottom wall 222 and a lower peripheral flange 220 having a transverse aperture 226 extending through a forward portion for receiving a lip portion 242 of keeper element 238 seated in the upper edge of the vertical wall 234 of the base 214. The keeper element of this embodiment functions in the same manner as the keeper elements of the previously described embodiments.

The kettle body 218 includes through the upper end thereof a slot 264 formed by a depressed body portion 266 forming a louvre-like construction as in FIGURES 1–7. In this embodiment, the portion 266 is directed rearwardly, i.e., in the direction opposite that shown in FIGURE 1.

The base 214 includes a base wall 230 integral with the vertical wall 234; see FIGURE 15, has formed therein, diametrically opposite keeper 238, an upwardly opening notch 244. The lower edge of the notch 244 includes an undercut notch portion 248 which receives an intermediate portion of the electrical cord 50 therethrough. As will be subsequently described, the notch portion 248 cooperates with a lower portion of the handle 216 to provide strain-relief means for the cord.

The vertical wall 234 of the base has a pair of rearwardly extending ear elements 245 which flank the notch 244. The ear elements 245 are transversely apertured at 247 to provide means for retaining the component parts in assembled relation.

The handle 216 comprises an intermediate hand-grip 252 similar to those previously described, and includes an upper depending portion 254 having a lower foot portion 256 conforming to the upper surface of the kettle body 218. The portion 254 has embedded therein and depending therefrom a L-shaped keeper element 258 including a leg portion 262 removably received in the slot 264.

The handle 216 includes integral with the hand-grip portion 252 a lower angular portion 268 terminating in a lower angular shoe or surface portion 276. The portion 276, when the kettle is assembled, will overlie notch portion 248 in substantially tight engagement with the cord 50 to prevent tension from being imposed on the cord within the kettle. The portion 268 of the handle includes a transverse bore 249 which will align with apertures 247, and a retaining nut-and-screw assembly 280 will retain the handle between the ear elements 245 and removal of the assembly 280 will permit complete disassembly and assembly of the kettle.

Considering FIGURES 17 and 18, another embodiment is indicated generally at 310. This embodiment includes a shell 312, a base 314, and a handle 316.

The shell 312 includes a body portion 318 identical with that of FIGURE 1; similar parts are identified by similar reference numerals with the prefix 300, and the particular portions will not be described in detail.

The base 314 includes at its forward end a keeper element 338 embedded in the vertical wall 334 of a base wall 330, and the lip portion 342 thereof is removably received in the aperture portion 326 of the kettle body flange 320.

The vertical wall 334 has formed in the rear portion thereof an upwardly opening notch 344 diametrically opposite the keeper element 338.

The handle 316 includes a hand-grip portion 352 integral with a depending portion 354 which terminates in a foot portion 356 and has a dependnig L-shaped keeper element 358 embedded therein. The keeper element 358 includes a leg portion 362 removably received in a slot 364 formed in the upper end of the kettle body 318.

The handle 316 includes on the lower end of an angular portion 368 a heel portion 370 forming an abutment shoulder 372 which will engage the outer surface of flange 320 when the kettle is assembled. The heel portion 370 includes a depending extension 371 which has a rear angular surface 373 extending into a substantially L-shaped portion 375.

The base wall 330 includes a transverse aperture 382 which conforms to the lower end of extension 371 and removably receives the same therein. The portion 371 includes a cord-receiving transverse aperture having a substantially "hour-glass" shape including upper and lower portions 343 and 345, respectively. The cord 50 will be threaded through the apertures 343, 345 in a substantially vertical condition and will subsequently be rotated 90° to be snugly received in the aperture portion 343.

The base wall 330 includes a vertical rib portion 348 extending vertically from the inner surface thereof immediately forward of the aperture 382. The rib portion 348 is similar in structure and function to the strain-relief portion 48 of FIGURE 2.

The wall 330 has depending therefrom below rib 348 an integral extension 345 which is transversely apertured at 347. The extension 371 includes a transverse bore 349 which will align with the aperture 347 in the assembled kettle and a suitable fastener such as cotter pin 380 will extend through these aligned portions and comprise the sole means to be removed or installed to permit complete disassembly or assembly of the kettle; just as in the previously described embodiments.

Each of the disclosed and described embodiments fully conforms with the objects of invention set forth. In each of these embodiments, a single fastener is removed, the shell can be separated from the base and/or handle. In the embodiments of FIGURES 1-7, 13-16 and 17-18, the handles are a component separate from the base and shell; in the embodiment of FIGURES 8-12, the handle is formed integrally with the base.

All of the embodiments include a handle which affords optimum balance and control during handling of the kettles. Further, all of the embodiments include strain-relief means for the cord, stresses are distributed over the upper end of the handles and the surface upon which the kettles rest will not be damaged.

The different embodiments are assembled in a relatively simple manner, thus lending to maintenance and repair by the individual owning the kettle rather than by a specialized repair man.

Although the invention has been disclosed and described with respect to hot water kettles, the novel construction lends itself for use on coffee pots or the like.

Further, although the disclosed kettles are circular in plan (not shown), the invention will lend itself for use on other shaped kettles or pots as will occur to those skilled in the art.

It will be obvious to those skilled in the art that various changes may be made without departing from the spirit of the invention, and therefore, the invention is not limited to what is shown in the drawings and described in the specification, but only as indicated in the appended claims.

What is claimed is:

1. An electrically heated kettle assembly comprising a metal body, a heating element therein having terminal portions extending through a lower portion of said body, an insulating base conforming to said lower portion and providing a free space beneath said body, a handle including a hand-grip portion contiguous with substantially the entire vertical height of said body portion, means detachably connecting said base to said body, said handle including a lower portion communicating with said free space, an electric cord having an electrical connection with said terminal portions of said heating element and including an intermediate portion extending through said base, said base and handle including strain-relief means engaging said intermediate cord portion for resisting tension applied thereto, said handle including upper and lower portions extending angularly from said hand-grip portion and respectively connected to an upper portion of said body and a portion of said base opposite means detachably connecting said base to said body, and a single fastener means retaining said body, handle and base in assembled relation.

2. The structure of claim 1 in which upper portions of said handle terminate in an enlarged foot portion complementary to and conforming to the shape of an underlying portion of said body.

3. The structure of claim 2 in which said handle is integral with said base and forms a single unit therewith.

4. The structure of claim 3 in which said upper handle portion includes a bore portion extending the length thereof, said body including an upper portion underlying said enlarged foot portion, said single fastener means comprising a screw extending through said bore portion and a nut element fixed to said upper body portion.

5. The structure of claim 3 in which said lower portion communicating with said free space comprises a transverse aperture at the lower portion of said lower handle portion and continuing through said base, said strain-relief means comprising a wedge element extending into said transverse aperture from within said space and overlying said intermediate cord portion.

6. The structure of claim 1 in which said means detachably connecting said base to said body comprises a keeper element embedded in said body and including a lateral lip portion, and said body including a lower transverse aperture removably receiving said lip portion.

7. The structure of claim 1 including means detachably connecting the terminal ends of said upper and lower handle portions to said body and base, respectively.

8. The structure of claim 7 in which upper portions of said handle terminate in an enlarged foot portion complementary to and conforming to the shape of an underlying portion of said body.

9. The structure of claim 7 in which said means detachably connecting said base to said body comprises a keeper element embedded in said body and including a lateral lip portion, and said body including a lower transverse aperture removably receiving said lip portion.

10. The structure of claim 7 in which said single fastening means comprises a terminally threaded stud depending from said body through said base, and a nut element secured to the threaded end of said stud beneath said base.

11. The structure of claim 7 in which said base includes a pair of outwardly extending, transversely apertured ear elements, said lower handle portion including a transverse aperture aligned with said apertured ear elements and extending therebetween, a nut-and-bolt assembly secured in the aligned apertures of said ear elements and said lower handle portion, said strain-relief means comprising a lower foot portion at the lower end of said handle and overlying and compressingly engaging said cord.

12. The structure of claim 7 in which said body portion comprises a slot portion through the upper portion thereof, said upper handle portion including a depending leg portion removably received in said slot.

13. The structure of claim 12 in which said leg portion includes a shoulder engaged on the outer surface of said body portion above said notch portion.

14. The structure of claim 7 in which said lower portion communicating with said free space comprises an upwardly opening notch portion in said base, said strain-relief means comprises a rib portion integral with said base and spaced inwardly from said notch portion, the lower end of said handle portion including a foot portion engaged upon said cord inwardly of said notch portion and below an upper edge of said rib portion.

15. The structure of claim 14 in which said base includes polygonal block portions flanking said notch portion, said lower portion of said handle portion including a lower portion complementary to said notch and block portions.

16. The structure of claim 14 in which said lower handle portion includes a first transverse bore through which said cord extends, a second transverse bore disposed below said first transverse bore, said base including an aperture adjacent said rib portion and removably receiving the lower end of said handle, said base including a depending portion including a transverse aperture aligned with the second transverse bore in said handle portion, and a fastening element extending through said last mentioned aperture and second bore portion.

17. The structure of claim 16 in which said first bore portion has an "hour-glass" cross-section.

No references cited.

JOHN F. BURNS, *Primary Examiner.*

LARAMIE E. ASKIN, *Examiner.*